(12) United States Patent
Sheehan

(10) Patent No.: US 7,886,301 B2
(45) Date of Patent: Feb. 8, 2011

(54) NAMESPACE MERGER

(75) Inventor: John M. Sheehan, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 11/770,768

(22) Filed: Jun. 29, 2007

(65) Prior Publication Data

US 2009/0007161 A1    Jan. 1, 2009

(51) Int. Cl.
G06F 9/46 (2006.01)
(52) U.S. Cl. .................................................... 718/104
(58) Field of Classification Search .................. 718/104
See application file for complete search history.

(56) References Cited

U.S. PATENT DOCUMENTS

| | | | |
|---|---|---|---|
| 5,724,512 A | | 3/1998 | Winterbottom |
| 5,765,154 A | * | 6/1998 | Horikiri et al. ......... 707/999.01 |
| 5,890,011 A | | 3/1999 | Abbondanzio et al. |
| 6,038,677 A | * | 3/2000 | Lawlor et al. .................. 714/4 |
| 6,061,743 A | | 5/2000 | Thatcher et al. |
| 6,256,031 B1 | | 7/2001 | Meijer et al. |
| 6,408,298 B1 | | 6/2002 | Van et al. |
| 6,687,701 B2 | | 2/2004 | Karamanolis et al. |
| 6,865,576 B1 | * | 3/2005 | Gong et al. .............. 707/999.1 |
| 6,915,507 B1 | | 7/2005 | Kaler et al. |
| 2002/0188758 A1 | | 12/2002 | Nakajima et al. |
| 2005/0149528 A1 | | 7/2005 | Anderson et al. |
| 2006/0080465 A1 | | 4/2006 | Conzola et al. |
| 2006/0150200 A1 | | 7/2006 | Cohen et al. |
| 2006/0265508 A1 | | 11/2006 | Angel et al. |
| 2007/0028215 A1 | | 2/2007 | Kamath et al. |
| 2008/0052102 A1 | * | 2/2008 | Taneja et al. ................... 705/1 |

FOREIGN PATENT DOCUMENTS

| | | |
|---|---|---|
| JP | 2004-110624 A | 4/2004 |
| KR | 10-0264636 B1 | 1/2000 |

OTHER PUBLICATIONS

Koivunen, et al., "Annotea Shared Bookmarks" MIT Laboratory for Computer Science, Oct. 25-26, 2003, pp. 7.
Ford, et al., "User Relative Names for Globally Connected Personal Devices", Massachusetts Institute of Technology, Feb. 2006, pp. 7.
Wright, et al., "Versatility and Unix semantics in namespace unification", ACM, vol. 2, No. 1, Feb. 2006, pp. 74-105.
PCT Application No. PCT/US2008/066543: International Search Report and Written Opinion of the International Searching Authority dated Oct. 31, 2008.

* cited by examiner

*Primary Examiner*—Andy Ho
(74) *Attorney, Agent, or Firm*—Woodcock Washburn LLP

(57) ABSTRACT

In a virtualization environment, there is often a need for an application to access different resources (e.g., files, configuration settings, etc.) on a computer by name. The needed resources can potentially come from any one of a plurality of discrete namespaces or containers of resources on the computer. A resource name can identify one resource in one namespace and another resource in another namespace, and the namespaces may have different precedence relative to one another. The resources needed by the application can be accessed by enumerating names in a logical merger of the namespaces such that as new names in the logical merger are needed they are dynamically chosen from among the namespaces. When two resources in different namespaces have a same name, the resource in the higher precedence namespace can be chosen.

20 Claims, 18 Drawing Sheets

NAMESPACE MERGER

BACKGROUND

Computer applications typically access computer or system resources through an operation system. Resources might be files, libraries, system services (e.g. cut & paste, printers), registry or configuration information, and others. A virtualization environment or component virtualizes an application's access to system resources, transparently handling the application's access to system resources as though the application were dealing directly with the operating system.

A virtualization environment can manage access to multiple sets of system resources, some of which may overlap or conflict. A native operating system might have a set of file resources including a file with a filename such as "/somepath/someFileName". An application virtualization package (or a set of shadow resources) might have a different file instance that uses the same filename; for example, "/path/someFileName". The virtualization environment will manage an application's access to "/path/someFileName" in a manner that is transparent to the application. The application might write to "/path/someFileName", and the virtualization environment will determine which instance of the file "/path/someFileName" will be the written to; the native operating system file or the virtualization package file.

Techniques related to managing access to resources are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

An application has virtualized access to resources on a computer that are named in a first namespace and a second namespace. The first namespace comprises a first list of names of resources and the second namespace comprises a second list of names of resources. Each namespace corresponds to a different set of resources on the computer, some of which, although in different sets, are named in both namespaces. That is, there can be different resources in each namespace that happen to have the same name. The application requests a resource for a first name, and in response the resource is obtained from the set of resources named by the first namespace by accessing the first namespace and the second namespace. The application requests a resource for a second name, and in response the resource is obtained from the set of resources named by the second namespace by accessing the first namespace and the second namespace.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to managing virtual access to resources on a computing system. A virtual environment is discussed first. A technique for static merger of resource namespaces is then explained. In contrast to static merger, dynamic merger of resource namespaces is then introduced and various methods of dynamic merger are explained. An example problem is then walked through as it would be processed by one of the embodiments for dynamic merger.

Virtual Environment

Figure 1:
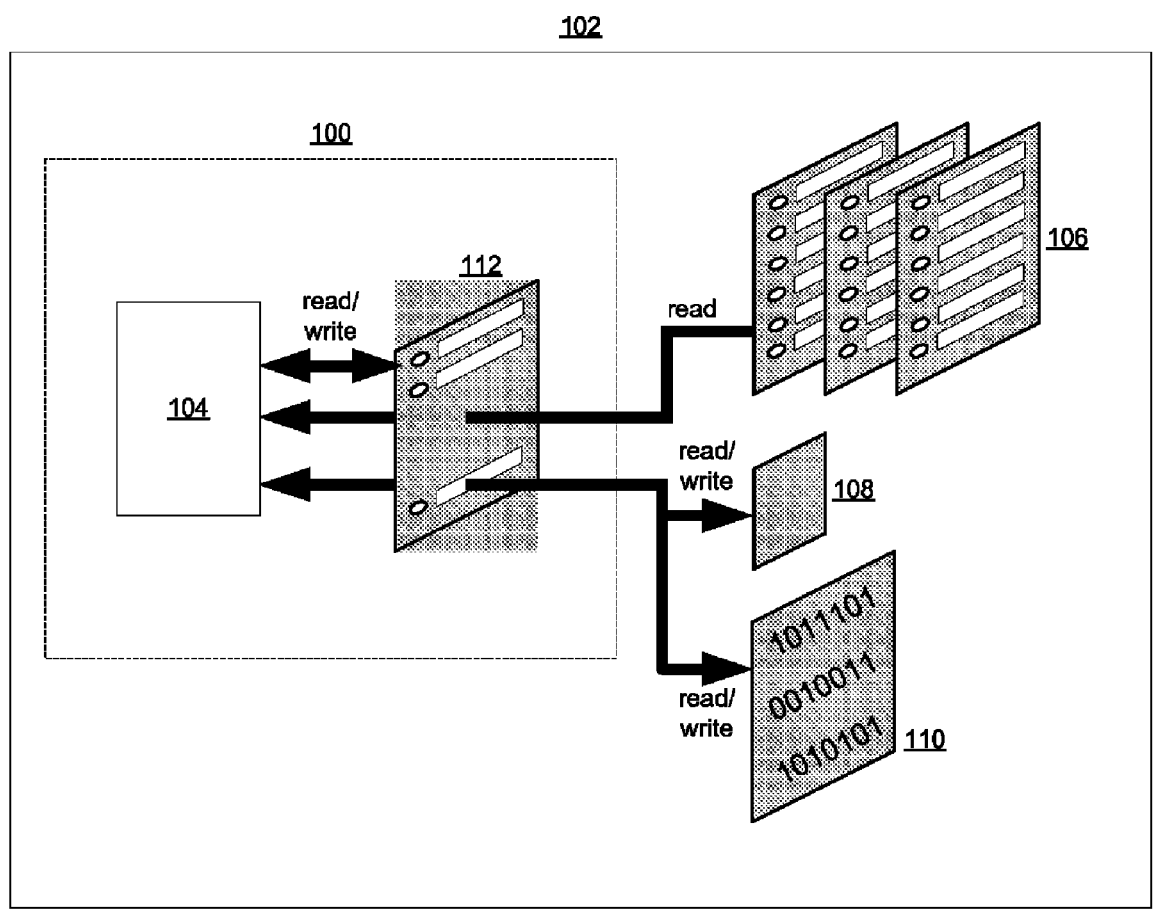
FIG. 1 shows a virtualization environment on a computer.

FIG. 1 shows a virtualization environment 100 on a computer 102. An application 104 running on the computer 102 accesses various system resources 106, 108, and 110 through the virtualization environment 100. The virtualization environment 100 manages the application's 104 access to the system resources 106, 108, 110. The system resources 106, 108, and 110 can be any type of resource available on a computer. For example, system resources 106 could be system files, registry or database entries, initialization or configuration files, dynamically loaded libraries, etc. System resources 108 could be system services such as an object communication service, printing services, cut & paste services, etc. System resources 110 could be profile data, TCP/IP addresses and/or ports, mutexes, semaphores, named pipes, COM objects, fonts.

The system resources 106, 108, and 110 may have different scope of visibility on the computer 102. Some resources 106, 108, 110 may be global native resources visible to all applications on the computer 102. Some system resources 106, 108, and 110 might be local resources visible or accessible only to the application 104. For example, an application virtualization package might include instances of files, registry entries, configuration settings, or other resources that only the application 104 uses. There might also be other semi-local resources that are available only to a certain user or to applications that are using the virtualization environment 100. Notably, any of these local or semi-local resources might have corresponding native resource instances (i.e., global resources on computer 102) having the same name. That is, as alluded to in the Background, given a resource name, there might be: an instance of a global resource with that name, an instance of a local resource with that name, and/or an instance of a semi-local resource with that same name. Techniques for merging and accessing such overlapping resources are discussed in detail below.

The virtualization environment 100 causes the resources 106, 108, 110 appear as one set of virtual resources 112. While the application 104 may execute read and/or write operations as though directly accessing system resources 106, 108, and 110, the virtualization environment 100 intermediates those operations. Generally the application 104 will not operate any differently than it would if the virtualization environment 100 were not present on the computer 102. However, embodiments discussed below for merging namespaces of resources (such as system resources 106, 108, and 110) will be applicable regardless of whether an application changes its behavior in the presence of a virtualization environment.

Figure 2:
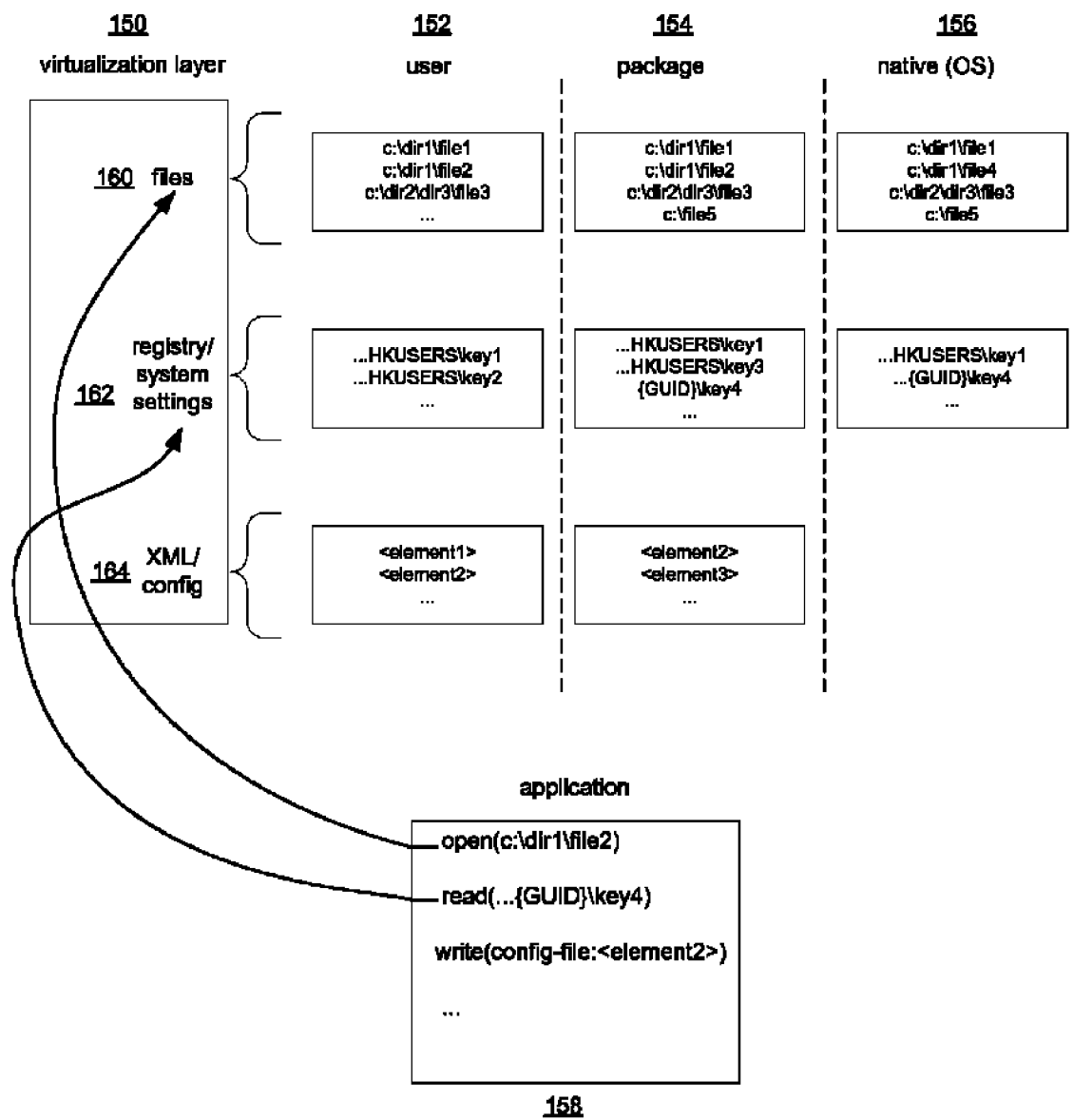
FIG. 2 shows a virtualization layer managing access to multiple sets of overlapping resources.

FIG. 2 shows a virtualization layer 150 managing access to multiple overlapping sets of resources 152, 154, and 156. An application 158 transparently accesses the resources 152, 154, and 156 through the virtualization environment 150. The sets of resources 152, 154, and 156 have different precedence and purpose. The user set 152 is scoped only to the application 158, the package set 154 is scoped to applications being run by a same user under the virtualization layer 150, and the global set 156 has global scope; any application or user identity on the host computer can potentially access the resource set 156. Other types of resources may be used. In another embodiment, set 152 could be for all applications running in the virtual environment and set 154 could be for all virtual environments across all users that are running an application. Although the sets of resources 152, 154, and 156 are shown divided into categories 160, 162, and 164 by type, this may not be necessary, depending on how resources are accessed on a particular computing platform. In one embodiment, a set of resources 152, 154, or 156 will be a container containing all types of resources with the same scope, e.g., global files, registry entries, network connections, or local files and system services, etc.

The sets of resources 152, 154, and 156 can overlap in that, as discussed above, one set of resources may have a resource instance with a same name as another resource instance in another set. In the example of FIG. 2, an instance of resource "c:\dir\file1" is in each of the sets of resources. The instances have different content, different size, etc. Another resource, such as "c:\dir1\file4", is only in the global resource set 156. The virtualization layer 150 handles the application's 158 request to open the file named "c:\dir1\file2". The virtualization layer 150, perhaps giving priority to the set of user resources 152, might open the instance of "c:\dir1\file2" in the use resources 152 and return a corresponding file handle or file object to the application 158, thus causing the application 158 to use the instance in the user set of resources 152. When the application accesses the file named "c:\dir1\file4", the resource is obtained from resource set 154, the only set that has the resource.

Merging Resource Namespaces

Figure 3:
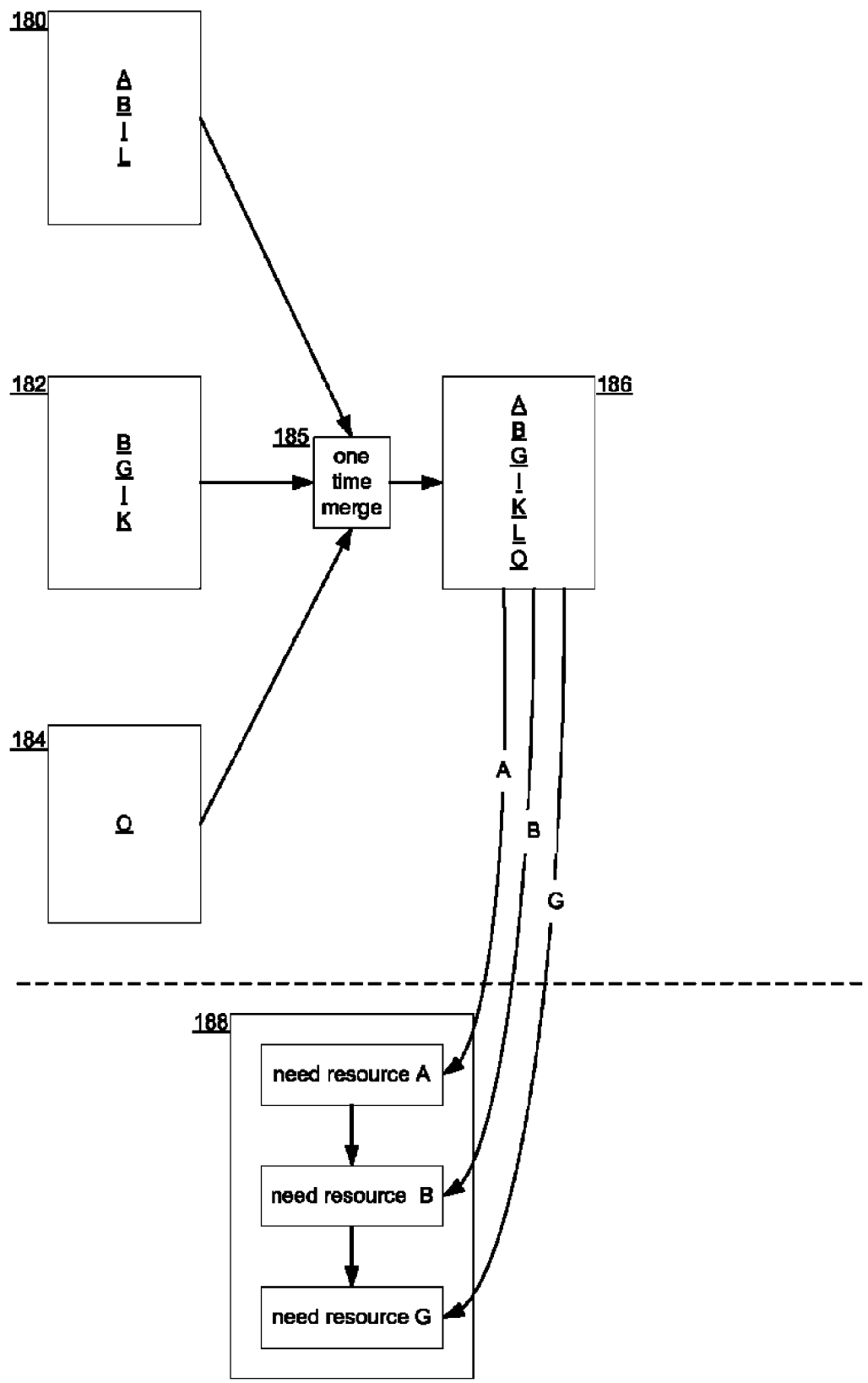
FIG. 3 shows a technique for one-time merging of resource namespaces.

FIG. 3 shows a technique for one-time merging of resource namespaces 180, 182, and 184. The letters in resource namespaces 180, 182, and 184 represent names of some arbitrary resource instances and like letters in different resource namespaces represent different instances of like-named resources (the different instances having different content). To provide consistent and logical access to the resources 180, 182, and 184, the resources are merged 185 to create a merged resource namespace 188. This merger 185 is performed before application 186 accesses the various resources in the resource namespaces 180, 182, and 184. The application 188, having a list of names of resources that it needs, begins to go through the list, requesting resource A, resource B, resource G, etc. When the application 188 needs a resource, for example, resource A, it obtains the resource from the fully merged namespace 186. Although a merged namespace may be discussed as containing names or resources, in practice such a merger will contain some globally unambiguous information such as a name (other than the name seen by the application), a unique identifier, a reference, etc. When a resource is described as being obtained from a namespace, this includes obtaining any information that allows the resource to be accessed, for example a pointer, a unique identifier or address, a data structure or object for accessing the object, etc.

There are several problems with the static merger approach of FIG. 3. For example, if the makeup of one of the base resource namespaces 180, 182, and 184 changes after the one-time merger 185, then either the merged resource namespace 188 will be incorrect and may supply the application 188 with incorrect resources, or the resource namespaces 180, 182, and 184 will need to be re-merged. Also, there is a performance cost incurred when namespaces are merged in advance.

Dynamic Resource Namespace Merger

Figure 4:
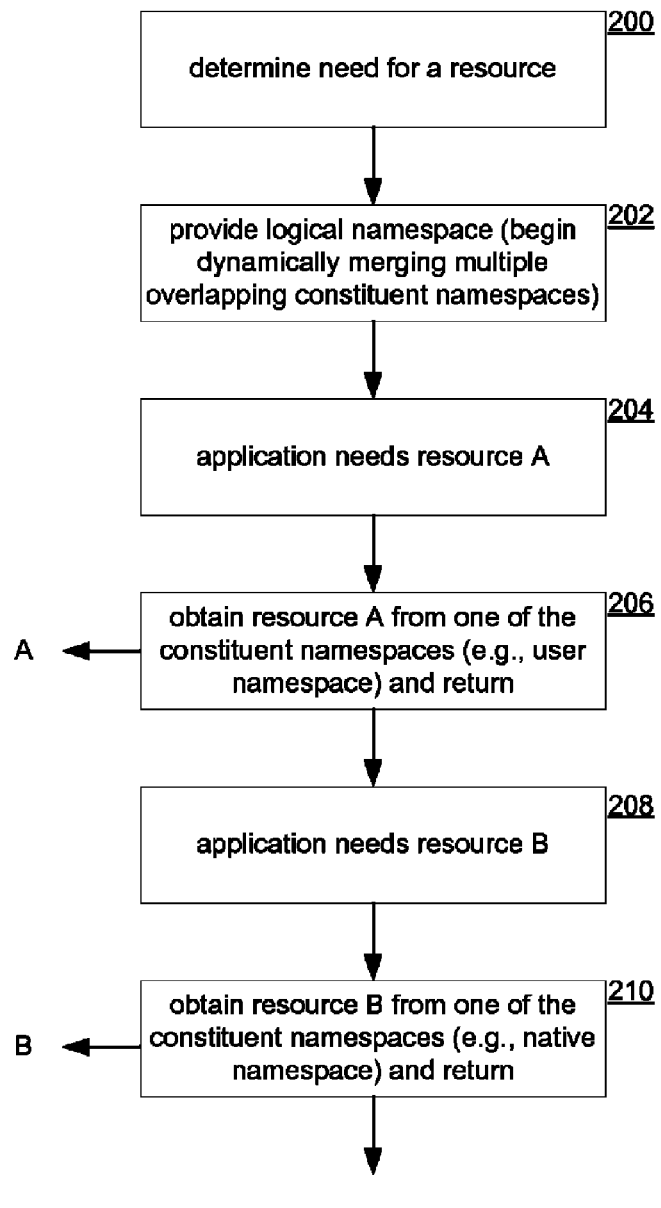
FIG. 4 shows a technique for dynamic merging of resource namespaces.

FIG. 4 shows a technique for dynamic merging of resource namespaces. With this approach, an application obtains resources as needed from two or more constituent resource namespaces, for example a local resource namespace and a global resource namespace. When a need for a resource has been determined 200, a logical namespace is provided 202 by dynamically merging the constituent resource namespaces. The logical namespace can be accessed via an object interface having methods for enumerating over a collection (a collection of names), where the logical namespace is generated (by dynamic merger of constituent resource namespaces) as parts of it are needed, thus giving the appearance to the application that the logical namespace is an actual namespace. When the application needs 204 a resource, such as resource A, logic for the dynamic merging obtains 206 same by finding a constituent resource namespace that has resource A and returns same to the application. Resource A might come from any of the constituent namespaces, such as the local namespace. When the application needs 208 another resource, such as resource B, the dynamic merging logic then looks at the constituent namespaces and determines which one will provide resource B, which is obtained 210 from the constituent namespace and returned to the application. Resource B might come from any of the constituent resource namespaces, such as the global namespace. Both namespaces might have instances of different resources named A and both might have instances of different resources named B.

Figure 5:
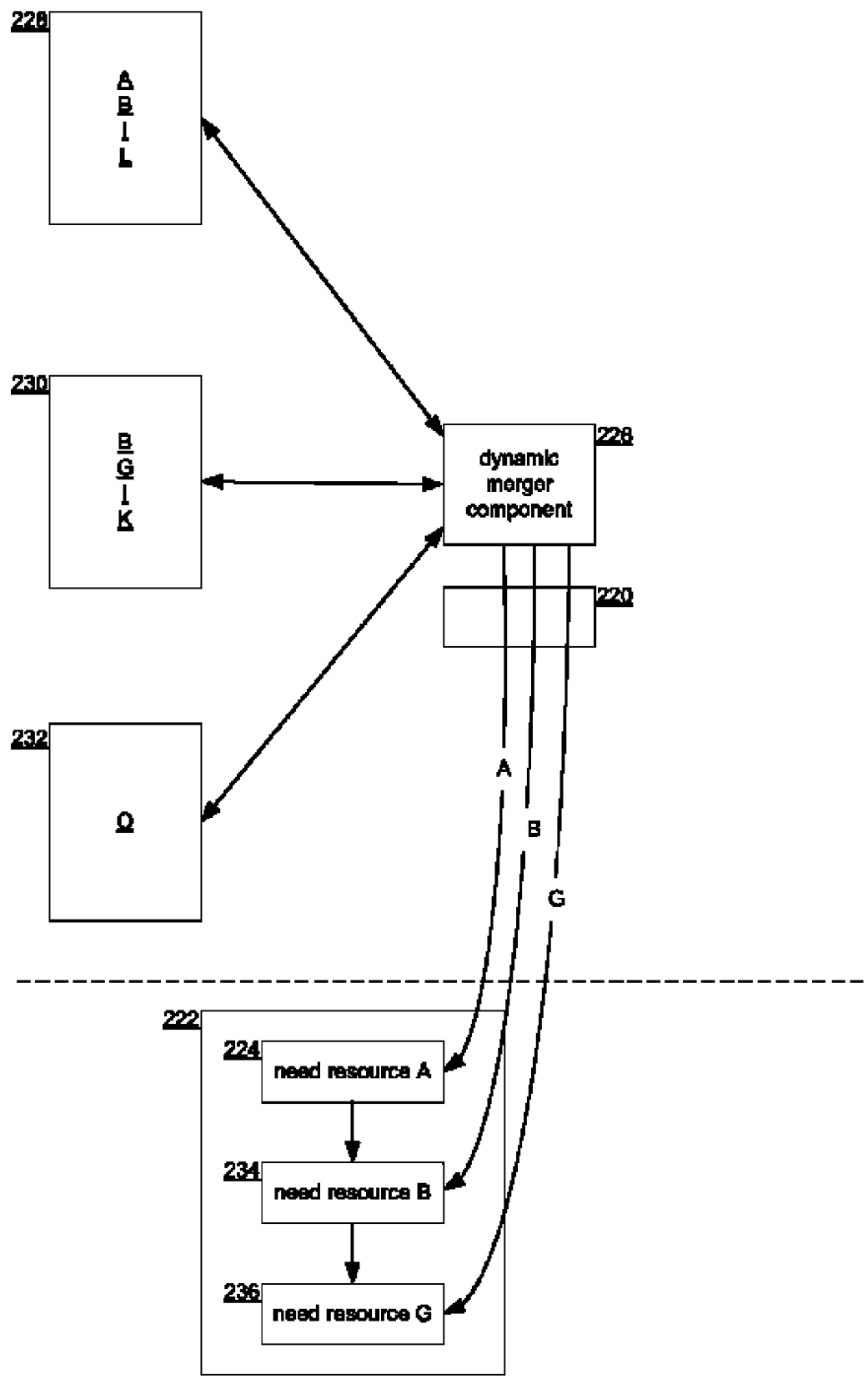
FIG. 5 shows a sequence of operations when enumerating a logical resource namespace.

FIG. 5 shows a sequence of operations when enumerating a logical resource namespace 220. When an application 222 needs 224 a resource named A, it requests the resource from the logical namespace 220, for example, using methods of an enumeration interface such as enumerate(), next(), nonempty (), first(), etc. A dynamic merger component 226 looks at unmerged names of resources in base resource namespaces 228, 230, and 232. The dynamic merger component 226 examines the base resource namespaces 228, 230, and 232 and returns resource A from base resource namespace 228, which is returned to the application 222 as the first resource in the logical resource namespace 220. When the application 222 needs 234 resource B, a similar process occurs; the dynamic merger component 226 looks at the unmerged names of the resources in the base resource namespaces 228, 230, and 232, and determines that resource B, though available in base resource namespaces 228 and 230, should come from base resource namespace 280. Resource B from base resource namespace 228 is returned to the application. When resource G is needed, it is returned from base resource namespace 230, and so on.

Figure 6:
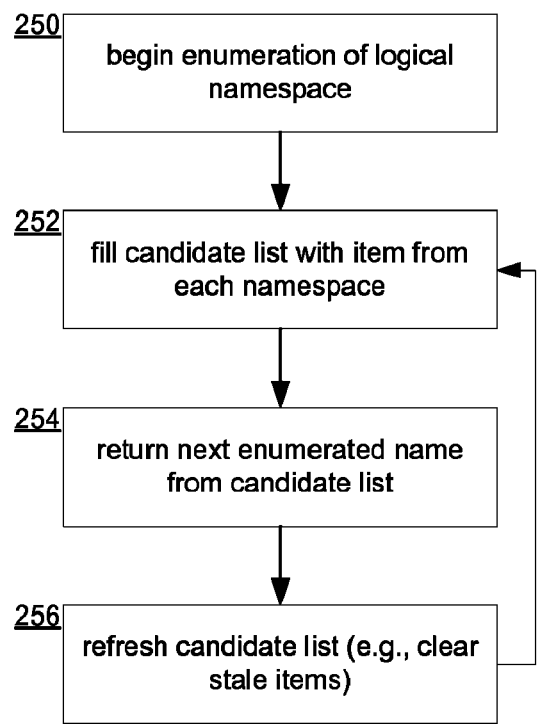
FIG. 6 shows a process for dynamic logical namespace merger.

FIG. 6 shows a process for dynamic logical resource namespace merger. As mentioned, enumeration of a collection (such as a collection of resources in a namespace) involves accessing the members of the collection such that previously un-accessed members of the collection are continually accessed (preferably in some logical order) until all of the members have been accessed. In the process of FIG. 6, an application or some other program begins an enumeration 250 of a logical resource namespace. A candidate list is populated or filled 252 with a next unused (unmerged) name from each candidate resource namespace. A rolling next-name of the logical resource namespace is returned 254 from the candidate list and is incremented to an empty slot. The candidate list is refreshed 256, for example, by removing from it the candidate name that was returned 254. As the process of FIG. 6 is repeated, any empty candidate list entries are again filled with next unused names from respective candidate resource namespaces, and the next-name in the logical namespace continually comes, via the candidate list, from one of the various candidate resource namespaces.

As can be seen, with some embodiments, resources from overlapping candidate resource namespaces are returned to an application from those namespaces, in rolling fashion, as needed by the application. If various arbitrary resources are needed, the underlying namespaces can be used to directly lookup a name without enumeration, in which case a lookup is performed in each namespace and the first hit is returned. With dynamic merging, if one of the candidate resource namespaces changes, that change is visible to the application. Furthermore, if an application requests resources by name in order (e.g., increasing alphabetical order), and if the candidate resource namespaces are pre-sorted accordingly, then the application can quickly obtain resources when requested because a complete merger need not be completed. This will become clearer as FIGS. 7-18 are discussed.

Figure 7:
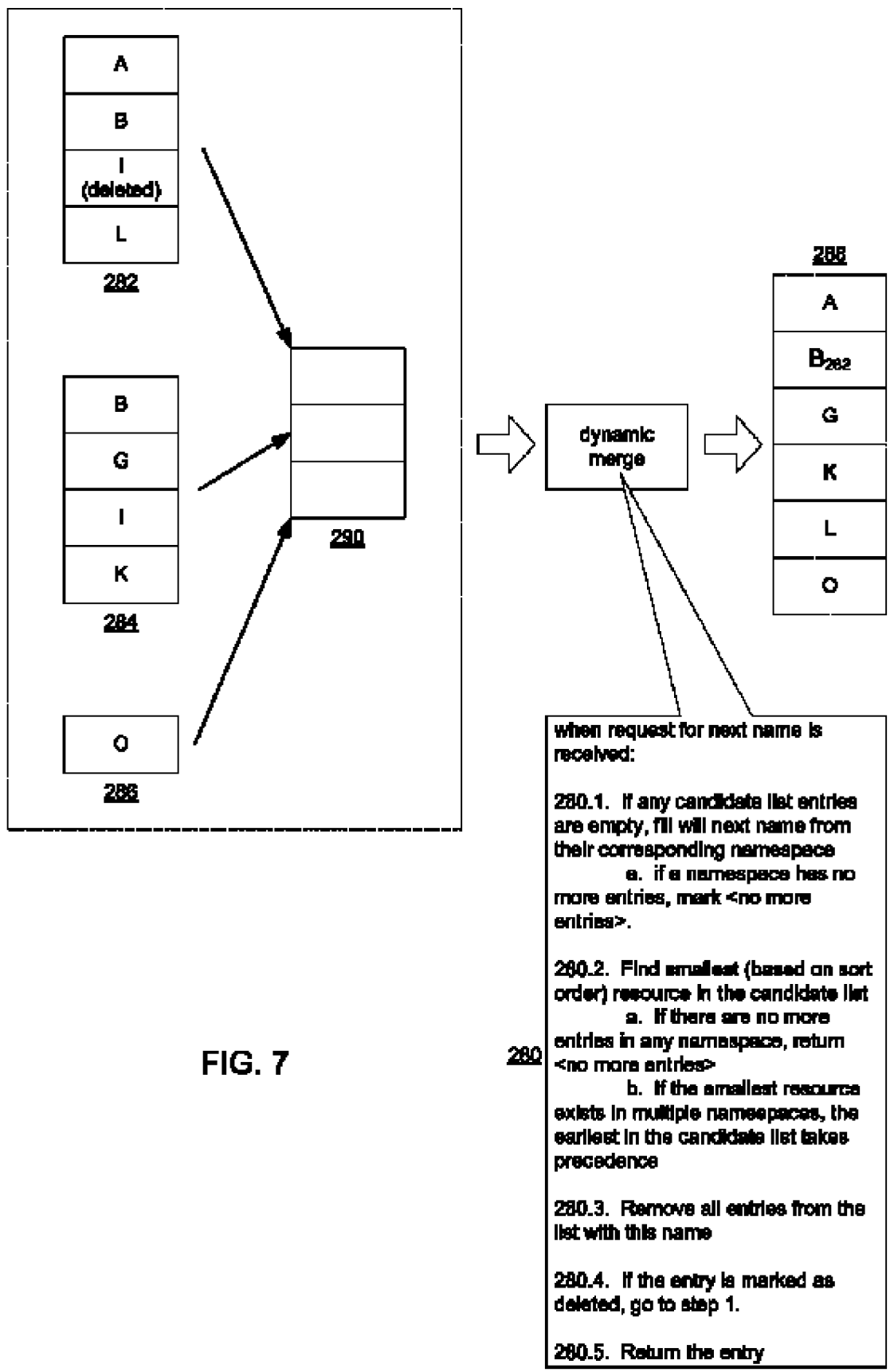
FIG. 7 shows a logical resource namespace that upon completion will have been dynamically generated from resource namespaces.
Figure 8:
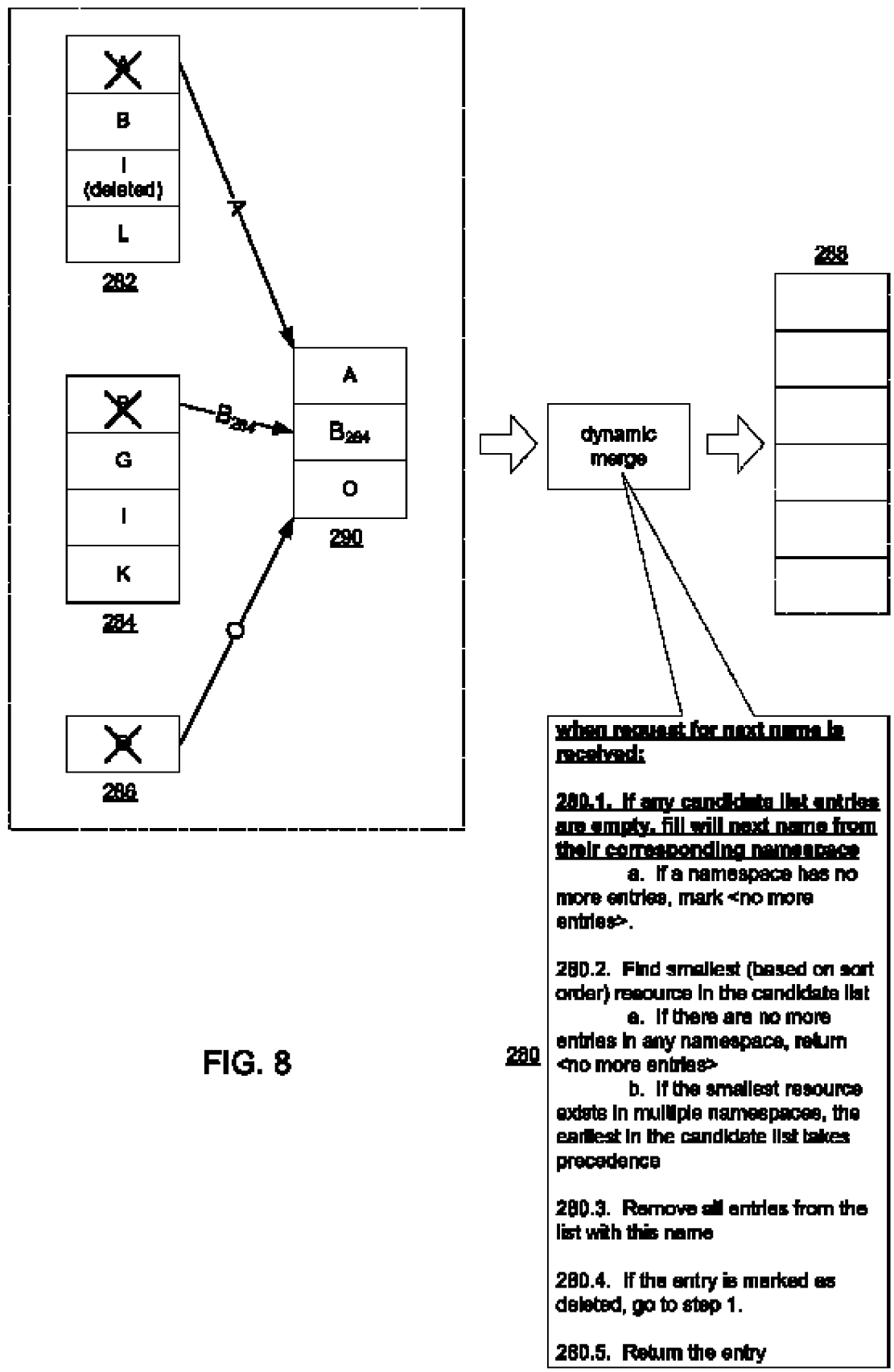
FIGS. 8-18 show a sequence of operations of a dynamic merger algorithm resulting in the logical resource namespace shown in FIG. 7.
Figure 16:
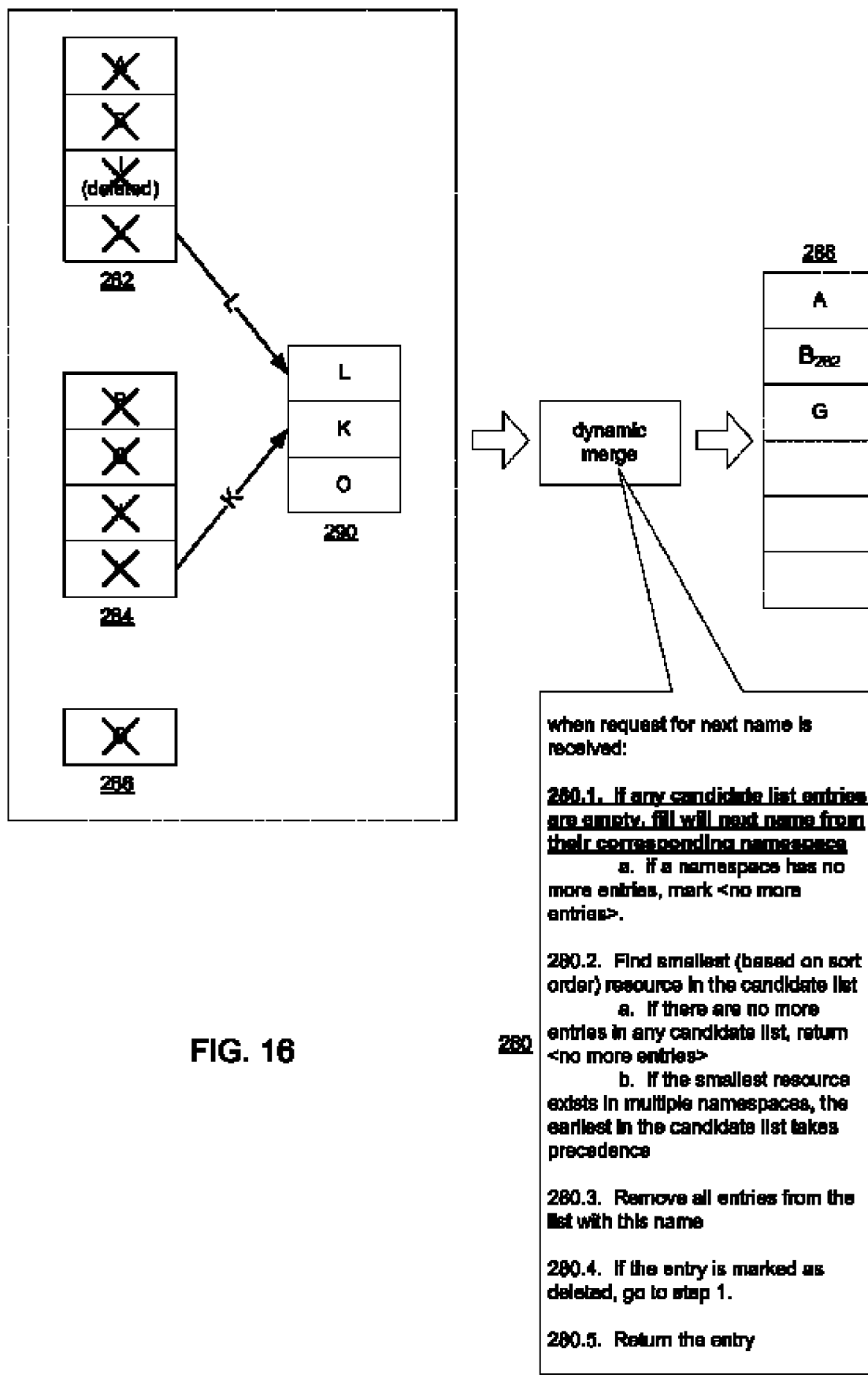
Figure 17:
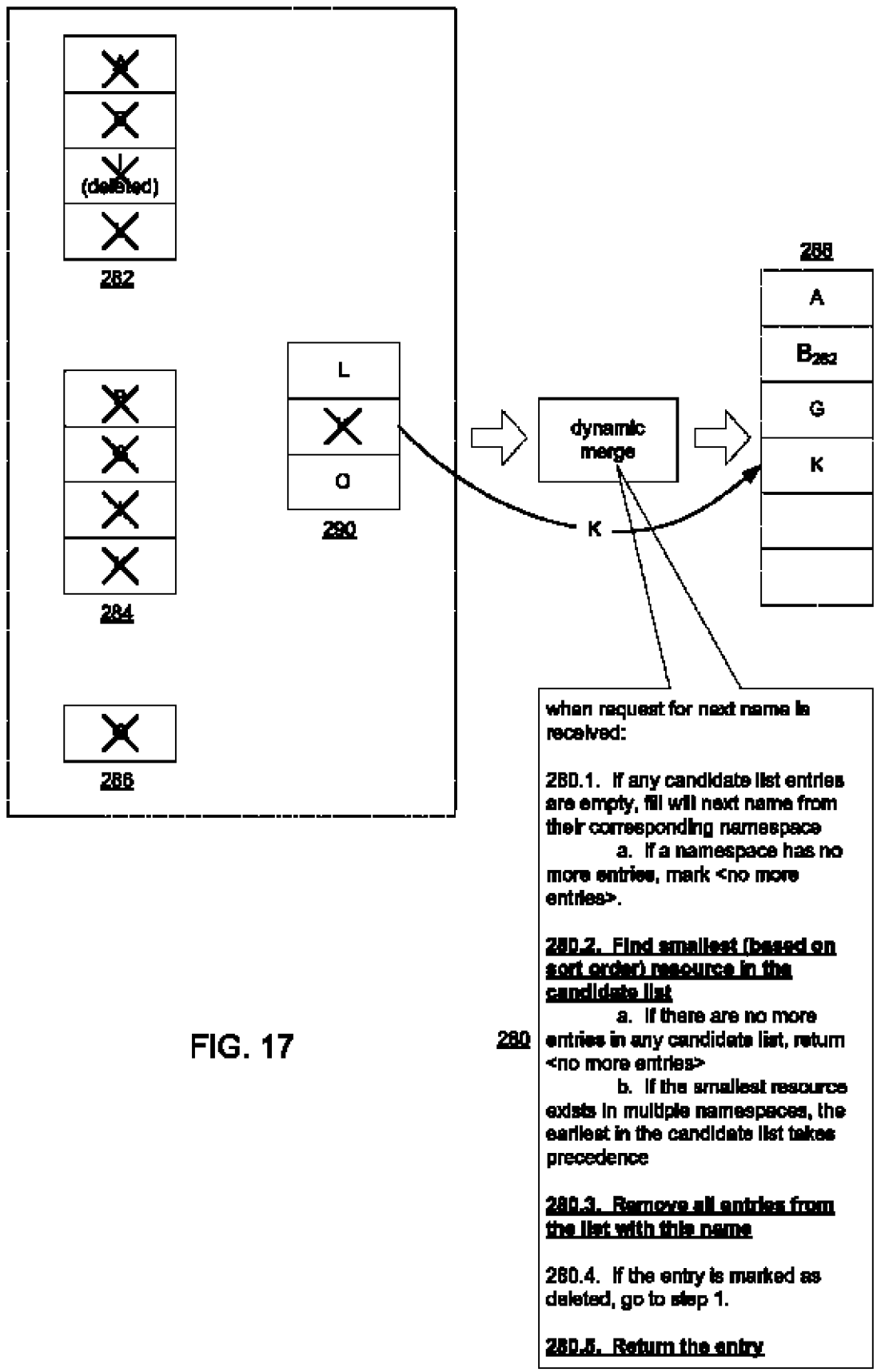
Figure 18:
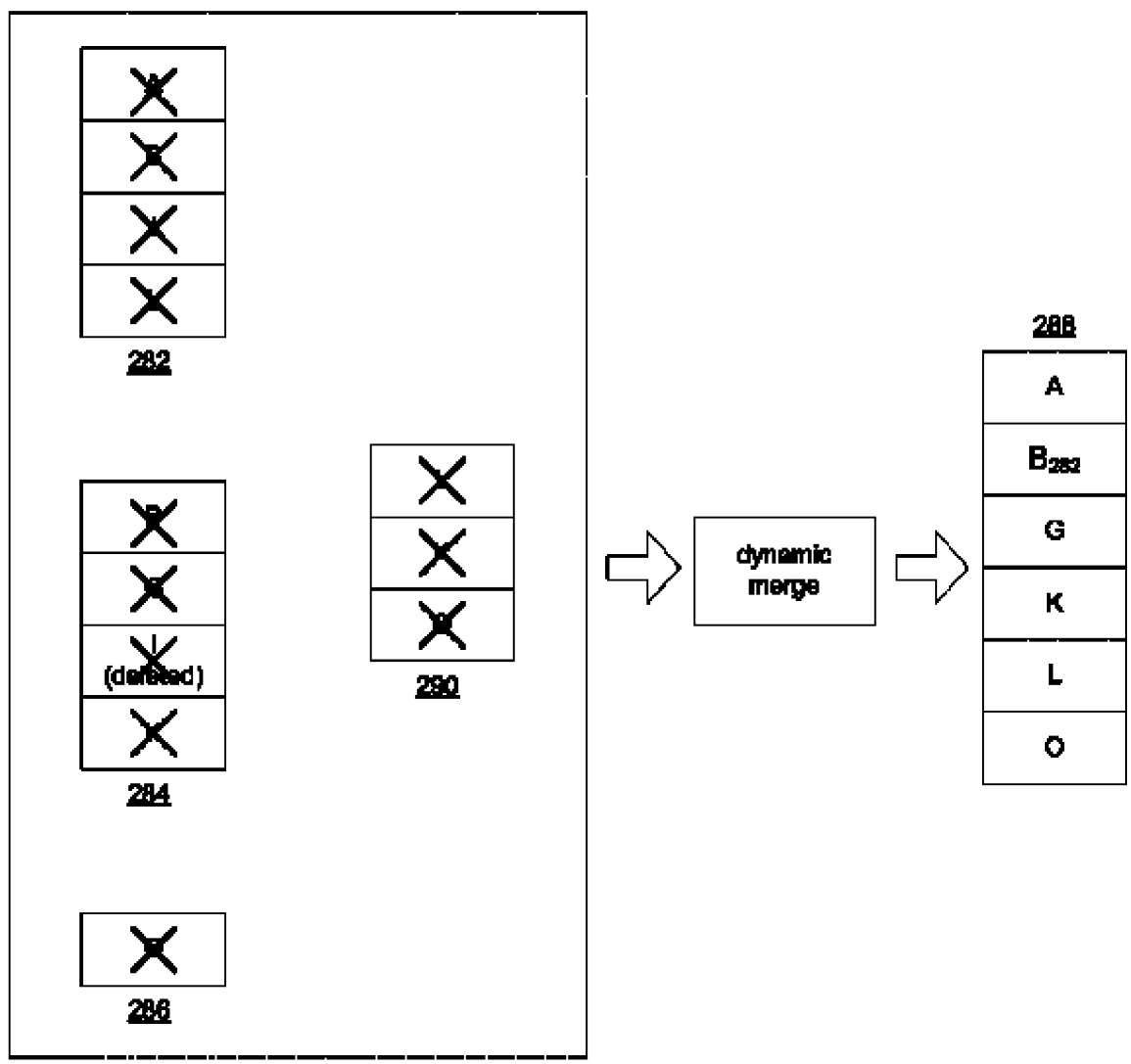

FIG. 7 shows a logical resource namespace 288 that upon completion will have been dynamically generated from example resource namespaces 282, 284, and 286. FIGS. 8-18 show a sequence of merger operations of a dynamic merger algorithm 280, as applied to the resource namespaces 282, 284, and 286, resulting in the logical resource namespace 288 shown in FIG. 7. The example resource namespaces 282, 284, and 286 are resource namespaces with different scopes and precedence. In this example, among the resource namespaces 282, 284, and 286, resource namespace 282 has the highest precedence and resource namespace 286 has the lowest precedence. In one embodiment the precedence of the resource namespaces 282, 284, and 286 can vary from one name to another. In other words, for one name resource namespace 282 may have the highest precedence, but for another name resource namespace 284 might have higher precedence. The empty initial logical namespace 288 is shown in FIG. 8 and the completed logical namespace 288 is shown in FIG. 18 (as well as FIG. 7).

Figure 9:
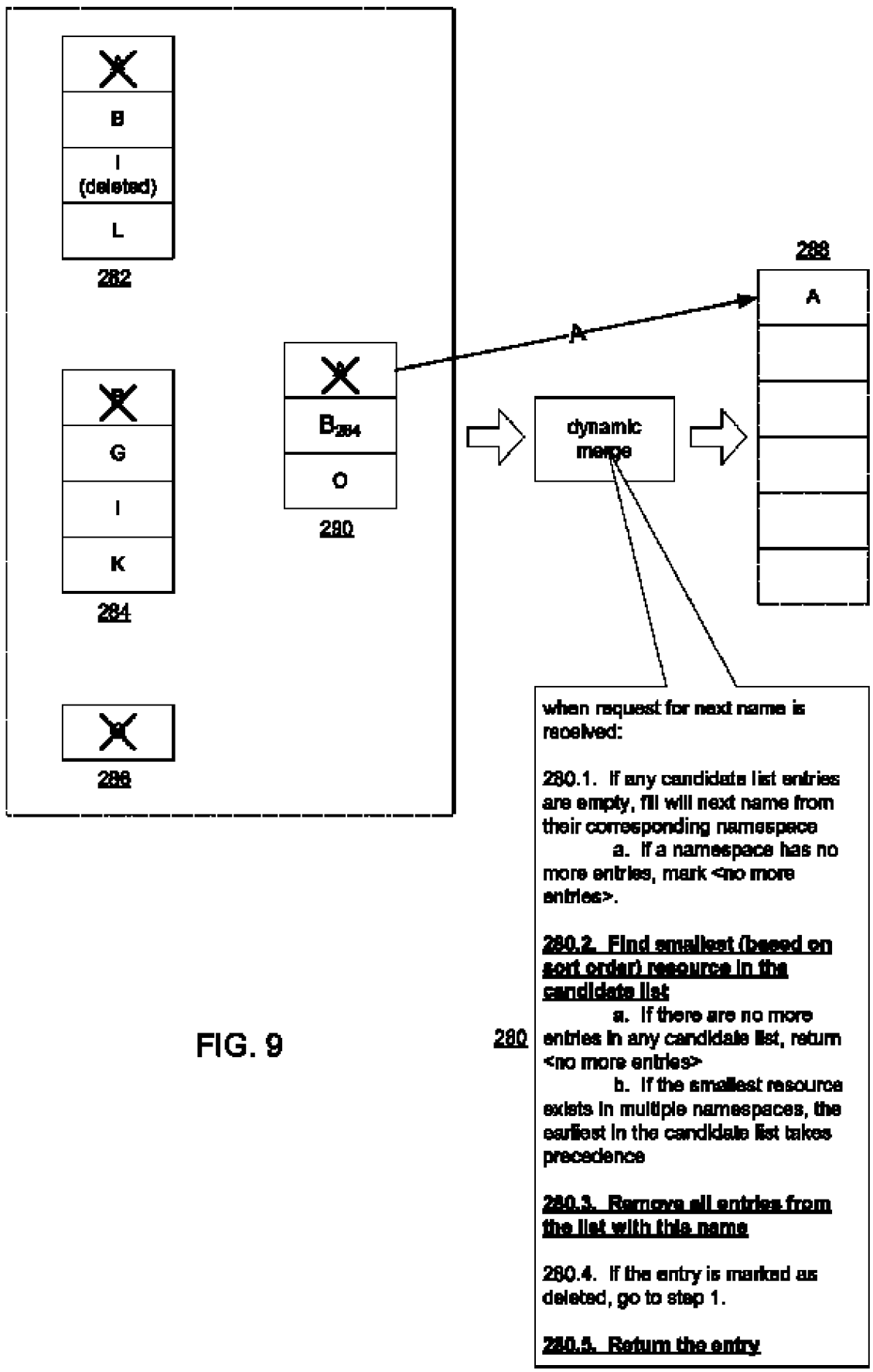

As shown in FIG. 8, initially a next name is needed from the logical namespace 288, as perhaps requested when some software begins enumerating the logical namespace 288. The software can be an application running in a virtualization environment or some other virtualized or quasi-virtualized software. The empty slots in candidate list 290 are then filled 280.1 with next names from their respective candidate namespaces; A from namespace 282, B from namespace 284, and O from namespace 286. These resources are marked as used in their respective namespaces, as represented by the "X"s in the candidate namespaces 282, 284, and 286. In FIG. 9, A, the smallest entry in the candidate list 290 is found 280.2, all entries in the candidate list 290 with that name are removed 280.3 (the A from namespace 282) and the found 280.2 entry, A, is returned 280.5 as the next name in the enumeration of the logical namespace 288.

Figure 10:
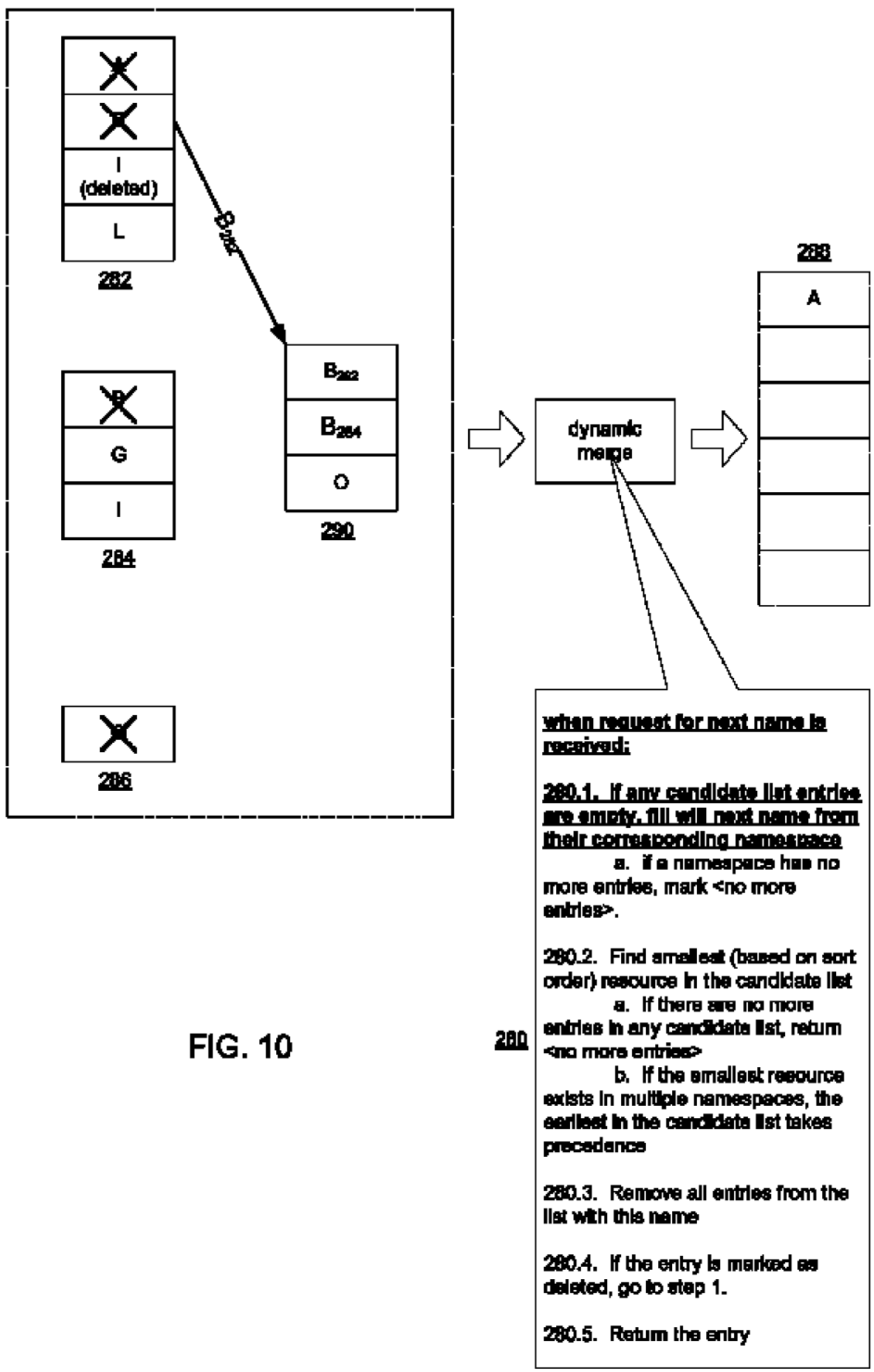
Figure 11:
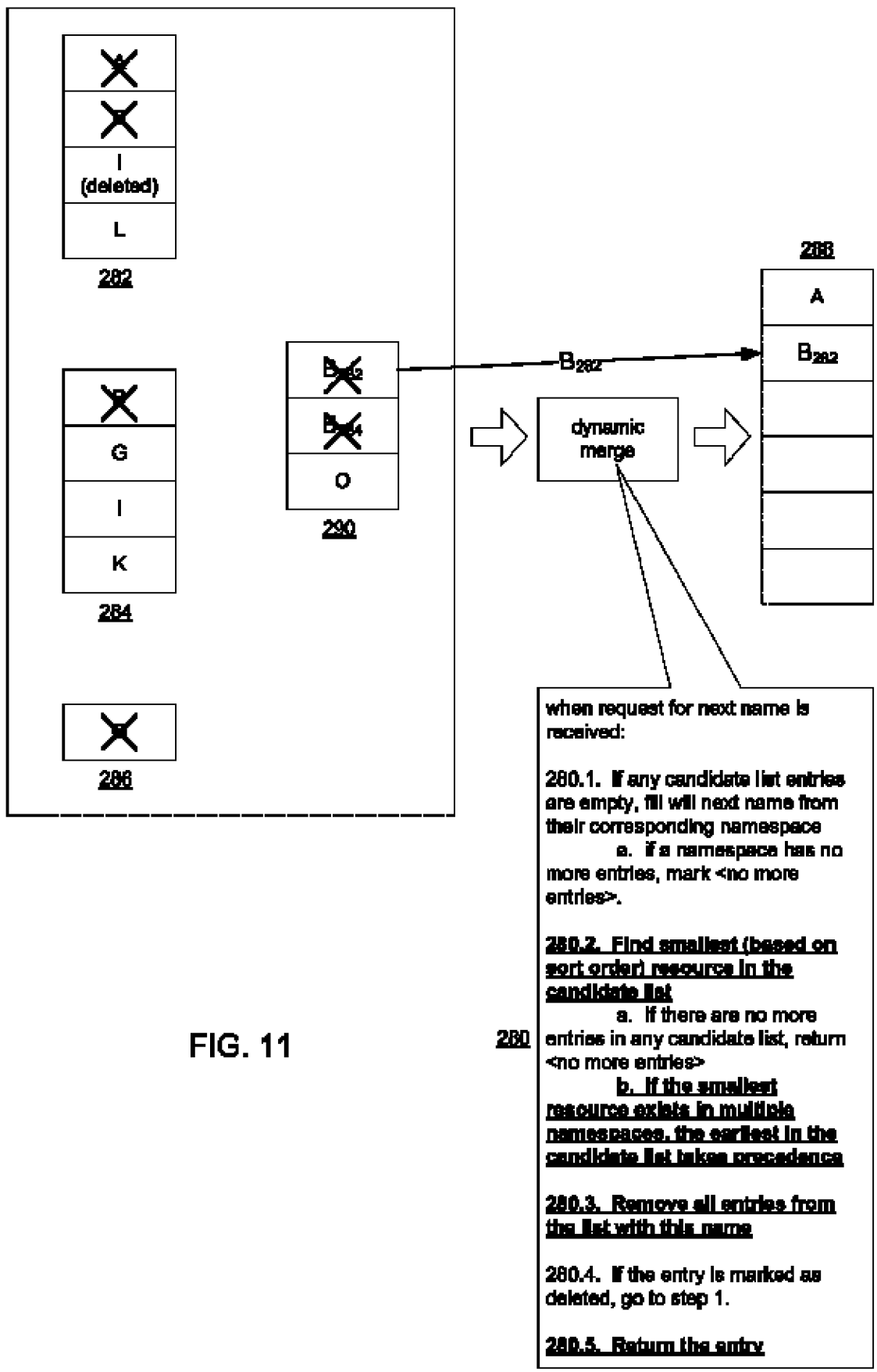

In FIG. 10, process 280 is repeated when a next name is needed from the logical namespace 288. The empty candidate for resource namespace 282 is filled with the next resource therein, which is $B_{282}$. $B_{282}$ is marked as used for the resource namespace 282. In FIG. 11, the smallest entry in the candidate list 290, B, is found 280.2. Since 280.2.b is the smallest resource name that exists in both namespaces 282 and 284 (there are two "B" entries in the candidate list 290), the earliest entry in the candidate list (the one from the highest priority resource namespace) is selected. All entries in the candidate list 290 with that name are removed 280.3 (the $B_{282}$ from namespace 282 and the $B_{284}$ from namespace 284). The found 280.2 entry, $B_{282}$, is returned 280.5 as the next name in the logical namespace 288.

Figure 12:
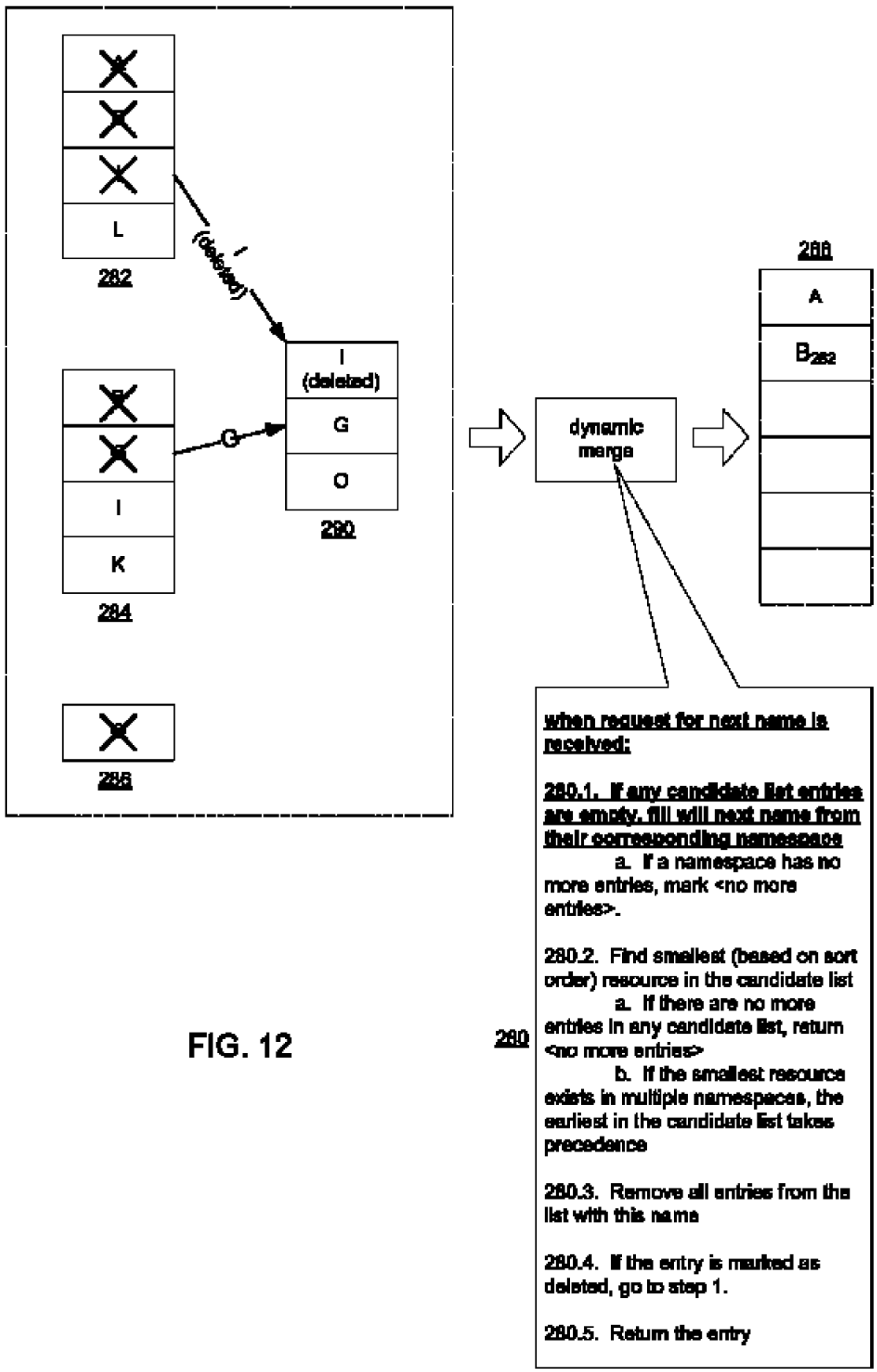
Figure 13:
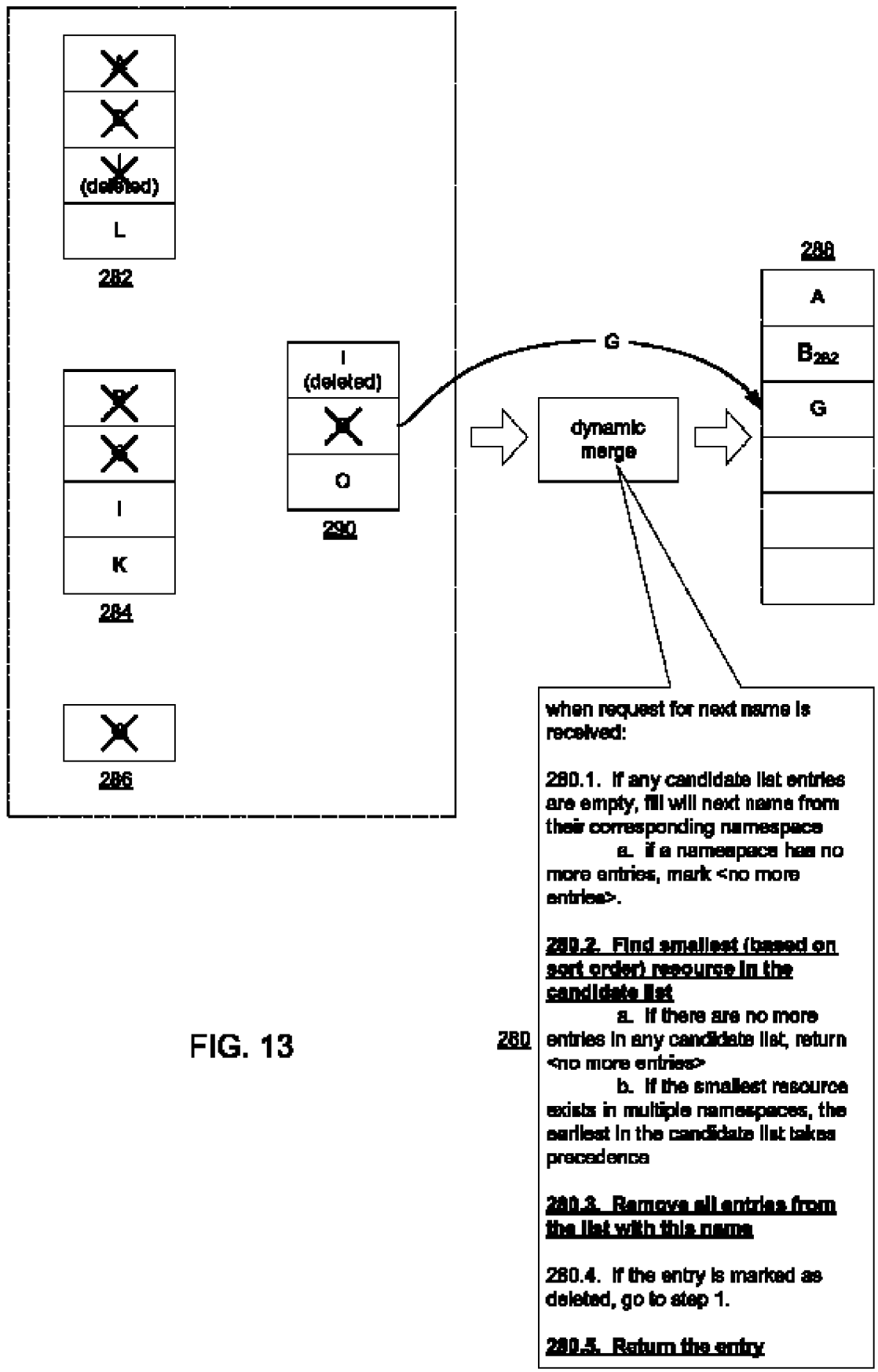

In FIG. 12, process 280 is repeated when a next name is needed from the logical namespace 288. The empty candidate for resource namespace 282 is filled with the next resource therein, which is I(deleted)—I is marked in resource namespace 282 as logically deleted. The empty candidate for resource namespace 284 is filled with the next resource therein, which is G. Both of these are marked as used in the corresponding resource namespaces 282 and 284. In FIG. 13, the smallest entry in the candidate list 290, G, is found 280.2, removed 280.3 from the candidate list 290, and returned 280.5 as the next name in the logical namespace 288.

Figure 14:
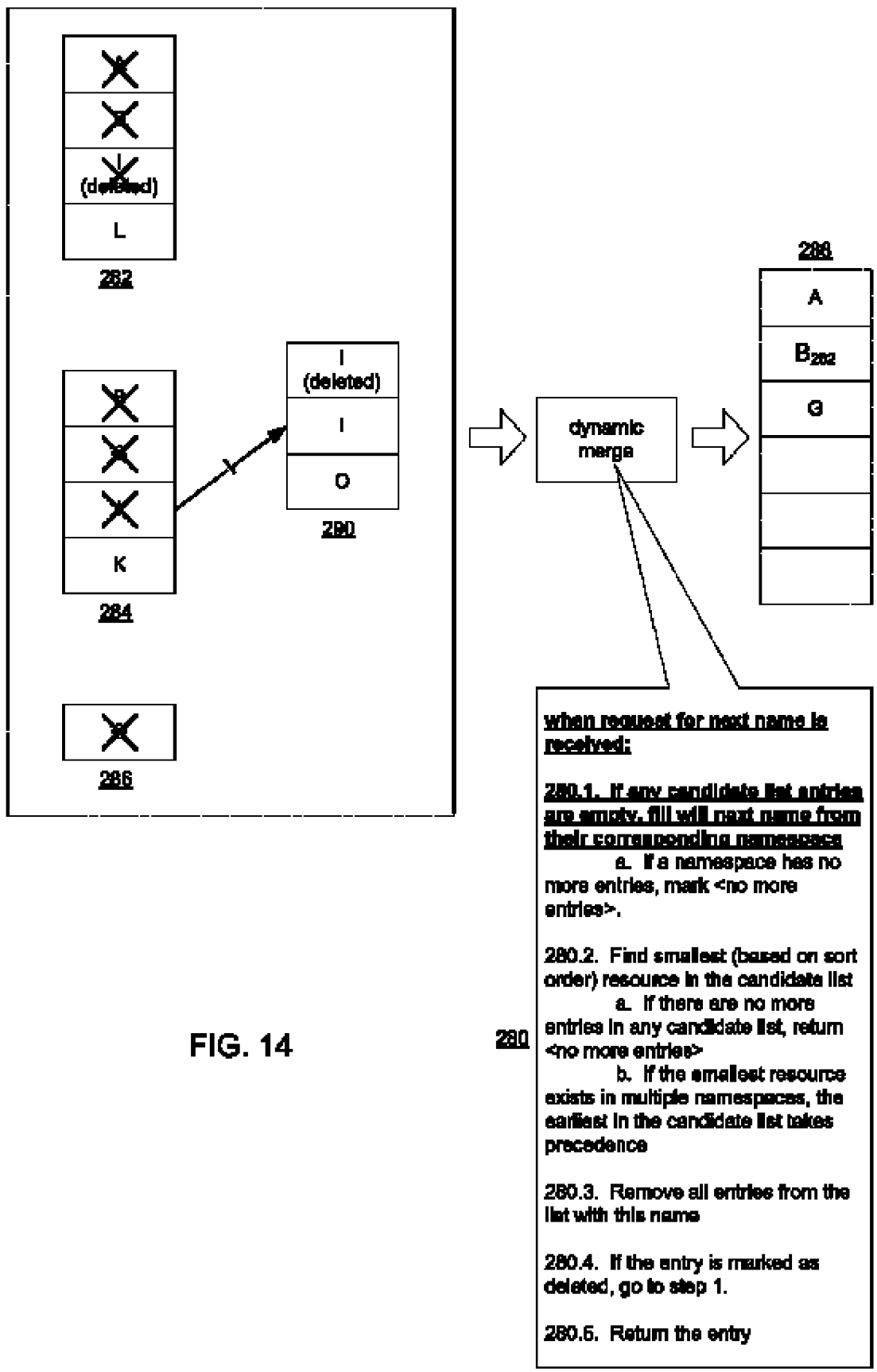
Figure 15:
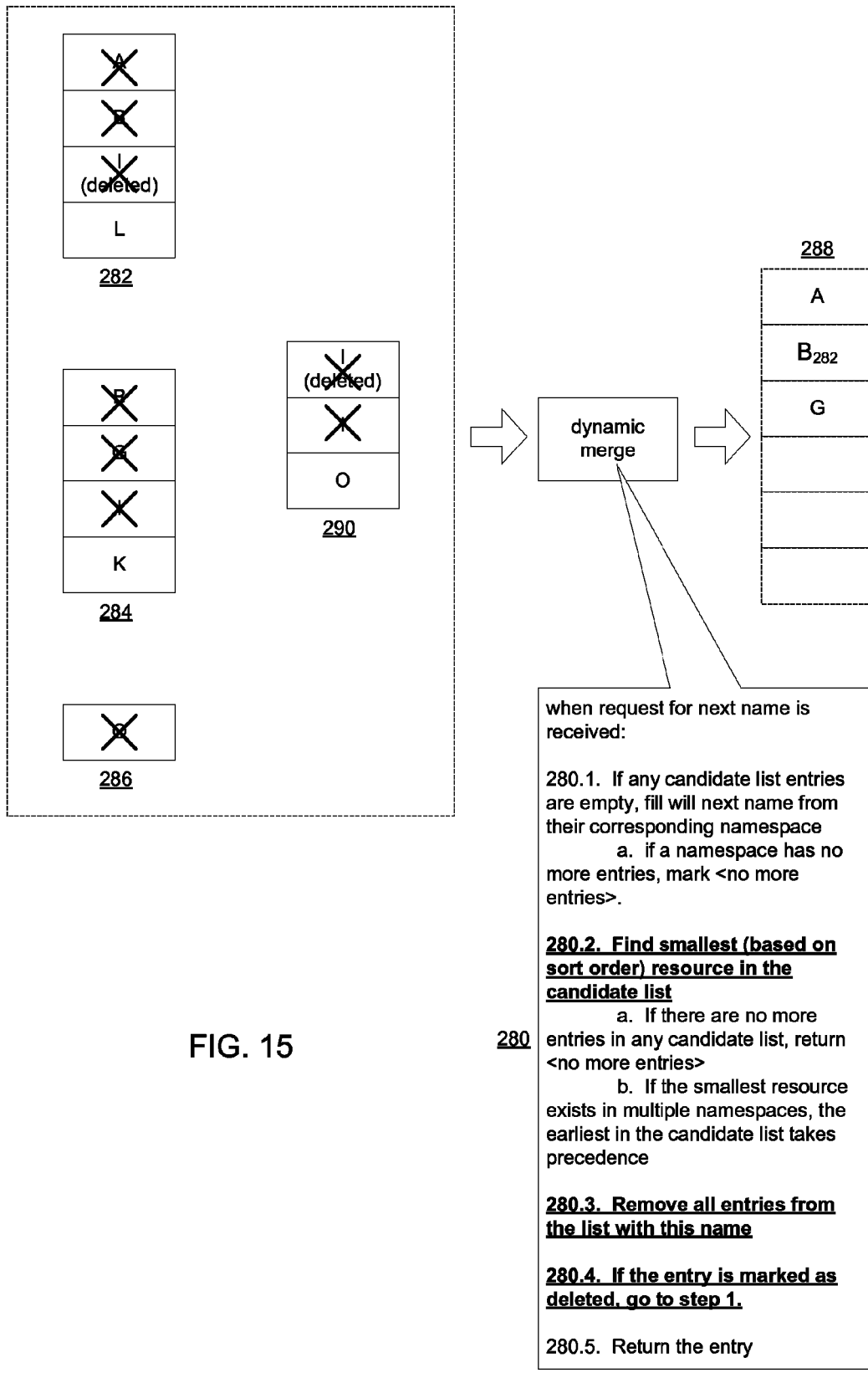

In FIG. 14, process 280 is repeated when a next name is needed from the logical namespace 288. The empty candidate for resource namespace 284 is filled with the next resource therein, which is I. This entry is marked as used in the resource namespace 284. In FIG. 15, the smallest entry in the candidate list 290, I(deleted), is found 280.2. All I entries are removed 280.3 from the candidate list 290. However, because there is an I entry that is marked as logically deleted (the entry from resource namespace 282), rather than return 280.5 I, the process 280 repeats and I is not returned as a member of the logical namespace 288 (note that when a name is marked as logically deleted in one namespace but not another, the name from the higher priority namespace controls whether deletion should occur). In FIG. 16, the candidate list 290 slots vacated by the I entries are filled 280.1 with names from the resource namespaces; L from resource namespace 282 and K from resource namespace 284. In FIG. 17, the smallest candidate resource, K, is found 280.2, removed 280.3 from the candidate list 290, and returned 280.5 as the next entry in the logical namespace 288. FIG. 18 shows a completed logical namespace 288 after several more iterations of the process 280.

Entries or elements of a logical namespace can take a variety of forms. Preferably, an entry has sufficient information to enable an application to use it to access the resource from the correct corresponding resource namespace. An entry can simply have a resource name or a reference to a resource name and an indication of which resource namespace it belongs to. For example, an entry might contain information indicating the name of a file and information indicating that the file is in a specific resource namespace. An identifier of the namespace might be included. An entry can contain a resource object or a reference thereto. Such an entry can be generated when a resource is to be added to the logical namespace during dynamic merger. The resource name is used to open the resource in the corresponding base resource namespace. An object, reference, filehandle, etc. is returned from the opening of the resource and is added to the logical namespace.

Logical deletion as discussed in the paragraph above can be useful to assure consistency between resource namespaces. If an application needs to delete a resource, it can logically delete the resource from one resource namespace without having to delete the resource from the other namespaces. The deletion will be effectuated through the logical merger. When the logical namespace is generated, no resources with the name of the logically deleted resource will be included in the logical namespace. Although useful, logical deletion is not required.

In accordance with embodiments discussed above, a logical resource namespace can be used efficiently by an application when the application is to enumerate the members of the logical namespace. That is, if an application needs to access a set of resources and the names of the resources to be accessed are ordered, the resources can be efficiently obtained from candidate namespaces. Referring to the example of FIG. 7, when an application accesses A, B, G, K, L, and O in that order, the resources (or names/references thereto) can be obtained from resource namespaces 282, 284, and 286 with little computational overhead. At the same time, conflicting resources can be consistently resolved such that higher priority resources are used over lower priority resources of the same name. Nonetheless, resources from lower precedence namespaces can still be used when the resources are not found in higher precedence namespaces.

CONCLUSION

The techniques for namespace merging discussed above are useful in, but not limited to, a virtualization setting. The techniques may be used when different sets of resources with namespace overlap are needed. Although some of the techniques work efficiently when resources namespaces are ordered, this is not required. Similarly, a logical namespace might be efficiently used if enumerated in order, alphabetical for example. However, this is not required and elements in a logical namespace can also be randomly accessed.

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on.

The invention claimed is:

1. A method for providing access to resources on a computer using a first namespace of resources on the computer and a second namespace of resources on the computer, where the resources of the namespaces are ordered, and where one or more names are common to both namespaces and those one or more names refer to different respective instances of resources, the method comprising:
   receiving a request for a resource by an application;
   responsive to the receiving, dynamically merging the first namespace and the second namespace to form a logical namespace; and
   obtaining the resource using the logical namespace.

2. A method according to claim 1, wherein the dynamic merging comprises:
   tracking a current candidate for the first namespace and a second candidate for the second namespace, and selecting a name for the logical namespace from the candidates.

3. A method according to claim 2, wherein the name for the logical namespace is selected based on the relative order of the current candidates.

4. A method according to claim 3, further comprising setting the first current candidate to a next name in the first namespace when the first current candidate has been selected as the name for the logical namespace.

5. A method according to claim 4, further comprising: when the second current candidate is the same as the first current candidate that has been selected as the name for the logical namespace, setting the second current candidate to a next name in the second namespace.

6. A method according to claim 1, wherein the resource is obtained from the logical namespace before completing the logical merger of the first namespace and the second namespace.

7. A method according to claim 1, wherein the namespaces are ordered by priority, such that when the current candidates are the same the current candidate of the higher priority namespace is selected.

8. A method of providing an application with virtualized access to resources on a computer, where the resources are named in a first namespace and a second namespace, the first namespace comprises a first list of names of resources and the second namespace comprises a second list of names of resources, where each namespace corresponds to a different set of resources on the computer, some of which, although in different sets, are named in both namespaces with a same name, the method comprising:
   requesting, by the application, a resource for a first name, and in response obtaining the resource from the set of resources named by the first namespace by accessing the first namespace and the second namespace; and
   requesting, by the application, a resource for a second name, and in response obtaining the resource from the set of resources named by the second namespace by accessing the first namespace and the second namespace.

9. A method according to claim 8, wherein the names in the first namespace are ordered and the names of the second namespace are ordered, and the resource of the first name is obtained on the basis of the order of its name in the first namespace relative to a same name in the second namespace.

10. A method according to claim 8, wherein the names in the first namespace are ordered and the names of the second namespace are ordered, and the obtaining comprises dynamically merging the namespaces such that subsequent requests for resources by name result in increasingly higher ordered names being returned from the namespaces.

11. A method according to claim 8, wherein the names in the first namespace are ordered and the names of the second namespace are ordered and the first and second resources are obtained by selecting their names from candidate windows that move along the first and second namespaces, where the names of the first and second resources are in the window, and the resource of the second name is obtained before the resource of the first name based on the name of the second resource having a lower order relative to the name of the first resource.

12. A method according to claim 8, wherein a name in one namespace is given priority over a same name in another namespace based on relative priorities of the namespaces.

13. A method according to claim 8, wherein when a name is logically deleted in the first namespace a corresponding resource of the first namespace and a corresponding resource of the second namespace both become unavailable to the application.

14. A method according to claim 8 wherein the requesting and the obtaining is performed repeatedly such that an ordered list of names of resources is obtained from names in both of the namespaces.

15. A method of accessing resources needed by an application, where the application is to access a plurality of resources by name in increasing (or decreasing) order, where the resources can potentially come from any one of a plurality of containers of resources on the computer, and where the containers have different and/or varying precedence relative to one another, the method comprising:
    for each container, providing a corresponding list of names of its resources in increasing (or decreasing) order; and
    accessing the resources needed by the application by enumerating names in a logical merger of the ordered lists of names such that as new names in the logical merger are needed they are dynamically chosen from among the ordered lists.

16. A method according to claim 15, wherein the choosing the names from among the ordered lists comprises:
    when the same previously unchosen name appears in two ordered lists, choosing the name from the list having that has the corresponding container of higher precedence.

17. A method according to claim 15, wherein the new names for the logical merger are chosen in order from among previously unchosen names in the ordered lists.

18. A method according to claim 17, wherein the choosing the names from among the ordered lists comprises:
    when there are previously unchosen names in two ordered lists, choosing the lowest name for the new name in the logical merger.

19. A method according to claim 15, wherein the choosing the names from among the ordered lists comprises:
    when a name in an ordered list is marked as logically deleted, treating the same name in another ordered list as logically deleted thus causing the name to be omitted from the logical merger of the ordered lists.

20. A method according to claim 15, wherein the resources are accessed when the logical merger of the ordered lists is incomplete.

* * * * *